(12) United States Patent
Kim

(10) Patent No.: US 8,874,673 B2
(45) Date of Patent: Oct. 28, 2014

(54) MOBILE TERMINAL, SERVER, AND METHOD FOR ESTABLISHING COMMUNICATION CHANNEL USING AUGMENTED REALITY (AR)

(75) Inventor: Hyoung-Jin Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 210 days.

(21) Appl. No.: 13/408,736

(22) Filed: Feb. 29, 2012

(65) Prior Publication Data

US 2013/0073637 A1   Mar. 21, 2013

(30) Foreign Application Priority Data

Sep. 15, 2011 (KR) .......................... 10-2011-0093103

(51) Int. Cl.
*G06F 15/16* (2006.01)
*G06F 9/54* (2006.01)

(52) U.S. Cl.
CPC ........................ *G06F 9/54* (2013.01)
USPC ....................................................... 709/206

(58) Field of Classification Search
CPC ..................... H04N 2201/3245; H04N 5/2723
USPC ........................................................ 709/206
See application file for complete search history.

(56) References Cited

U.S. PATENT DOCUMENTS

| 7,773,618 | B2 * | 8/2010 | Leonard et al. ................ 370/409 |
| 8,564,710 | B2 * | 10/2013 | Nonaka et al. ............ 348/333.02 |
| 2007/0024527 | A1 | 2/2007 | Heikkinen et al. |
| 2008/0195315 | A1 * | 8/2008 | Hu et al. ........................ 701/212 |
| 2009/0003662 | A1 | 1/2009 | Joseph et al. |
| 2009/0081959 | A1 | 3/2009 | Gyorfi et al. |
| 2011/0319131 | A1 * | 12/2011 | An et al. ..................... 455/556.1 |
| 2012/0044163 | A1 * | 2/2012 | Sim et al. ...................... 345/173 |
| 2012/0092528 | A1 * | 4/2012 | Jung et al. ..................... 348/239 |
| 2012/0180084 | A1 * | 7/2012 | Huang et al. ..................... 725/32 |
| 2012/0188396 | A1 * | 7/2012 | Kim ........................... 348/222.1 |
| 2012/0194706 | A1 * | 8/2012 | Kwak ........................... 348/239 |
| 2012/0236029 | A1 * | 9/2012 | Newhouse et al. ........... 345/633 |

FOREIGN PATENT DOCUMENTS

| KR | 10-0677502 | 1/2007 |
| KR | 1020080107211 | 12/2008 |
| KR | 10-2010-0000189 | 1/2010 |
| KR | 1020100124947 | 11/2010 |
| KR | 10-1016556 | 2/2011 |
| KR | 10-1039611 | 6/2011 |

OTHER PUBLICATIONS

IP.com search.*

\* cited by examiner

*Primary Examiner* — Arvin Eskandarnia
(74) *Attorney, Agent, or Firm* — H.C. Park & Associates, PLC

(57) ABSTRACT

A method for performing a communication using a virtual object includes displaying a dynamic virtual object on a display screen; identifying the dynamic virtual object in response to a selection input; determining a target to which the identified dynamic virtual object is to be transmitted; and performing a communication using the identified dynamic virtual object. A terminal to communicate using a virtual object includes a virtual object providing unit to provide a dynamic virtual object on a display screen; a virtual object managing unit to store the dynamic virtual object and target information of a target corresponding to the dynamic virtual object; a virtual object selection unit to select the dynamic virtual object in response to a selection input; and a channel establishing unit to establish a communication channel with the target using the dynamic virtual object.

19 Claims, 13 Drawing Sheets

MOBILE TERMINAL, SERVER, AND METHOD FOR ESTABLISHING COMMUNICATION CHANNEL USING AUGMENTED REALITY (AR)

CROSS-REFERENCE TO RELATED APPLICATION

This application claims priority from and the benefit under 35 U.S.C. §119(a) of Korean Patent Application No. 10-2011-0093103, filed on Sep. 15, 2011, which is hereby incorporated by reference for all purposes as if fully set forth herein.

BACKGROUND

1. Field

The following description relates to a terminal, server, and method for establishing a channel based on an Augmented Reality (AR) technology.

2. Discussion of the Background

Augmented Reality (AR) refers to technology showing a physical, real-world environment of which elements are augmented by computer-generated sensory input. In the augmented reality, a technique may be used for combining a real world with a virtual world having additional information to be shown in a single display screen. The AR may use a real-environment image as a main image while supportively using a virtual-world image created using computer graphics. The computer graphics provide additional information associated with the real-environment image. In an augmented reality environment, a distinction between real and virtual environments may be vague by overlapping a real image with a 2-dimensional or 3-dimensional virtual image. A conventional Virtual Reality (VR) technology may cause a user to be immersed in a virtual environment so that the user might not distinguish a real environment from the virtual environment. However, the AR technology combines a real environment with virtual objects.

Since the AR technology has emerged, efforts for applying the AR technology to various technical fields have been made, and efforts for applying the AR technology to a game field have been made. Further, with enhancements of computing capacity of a mobile terminal, such as a mobile phone, a PDA, a smart phone, a smart pad, etc., and with development of wireless network technologies, various AR-based systems have been introduced. Accordingly, a demand for various contents for applying such AR-based systems to mobile devices also has increased.

SUMMARY

Exemplary embodiments of the present invention provide a mobile terminal, a server, and a method for establishing a channel using an Augmented Reality (AR) object. Exemplary embodiments of the present invention provide a terminal, server and method for establishing a communication channel using a combination of an Augmented Reality (AR) technology with a communication service technology.

Additional features of the invention will be set forth in the description which follows, and in part will be apparent from the description, or may be learned by practice of the invention.

An exemplary embodiment of the present invention provides a method for performing a communication using a virtual object, including identifying a dynamic virtual object on a display screen in response to a selection input; determining a target to which the identified dynamic virtual object is to be transmitted; and performing a communication using the identified dynamic virtual object.

An exemplary embodiment of the present invention provides a method for communicating using a virtual object, including generating an augmented environment by combining a real environment with a virtual environment, the virtual environment including one or more dynamic virtual objects; displaying the augmented environment; receiving an object selection input, the object selection input corresponding to a first dynamic virtual object among the dynamic virtual objects; receiving a selection of a target using the first dynamic virtual object; and establishing a communication channel with the target using the first dynamic virtual object, and transmitting the first dynamic virtual object to the target.

An exemplary embodiment of the present invention provides a terminal to communicate using a virtual object, including a virtual object providing unit to provide a dynamic virtual object on a display screen; a virtual object managing unit to store the dynamic virtual object and target information of a target corresponding to the dynamic virtual object; a virtual object selection unit to select the dynamic virtual object in response to a selection input;

and a channel establishing unit to establish a communication channel with the target using the dynamic virtual object.

An exemplary embodiment of the present invention provides a server to provide a communication using a virtual object, including a client information database to store client information including information of a terminal; a virtual object information database to store and manage information corresponding to a generated dynamic virtual object; a processor to generate the dynamic virtual object, and to provide the dynamic virtual object to the terminal; and a channel information database to store channel information between the terminal and a target terminal, the channel information associated with the dynamic virtual object.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
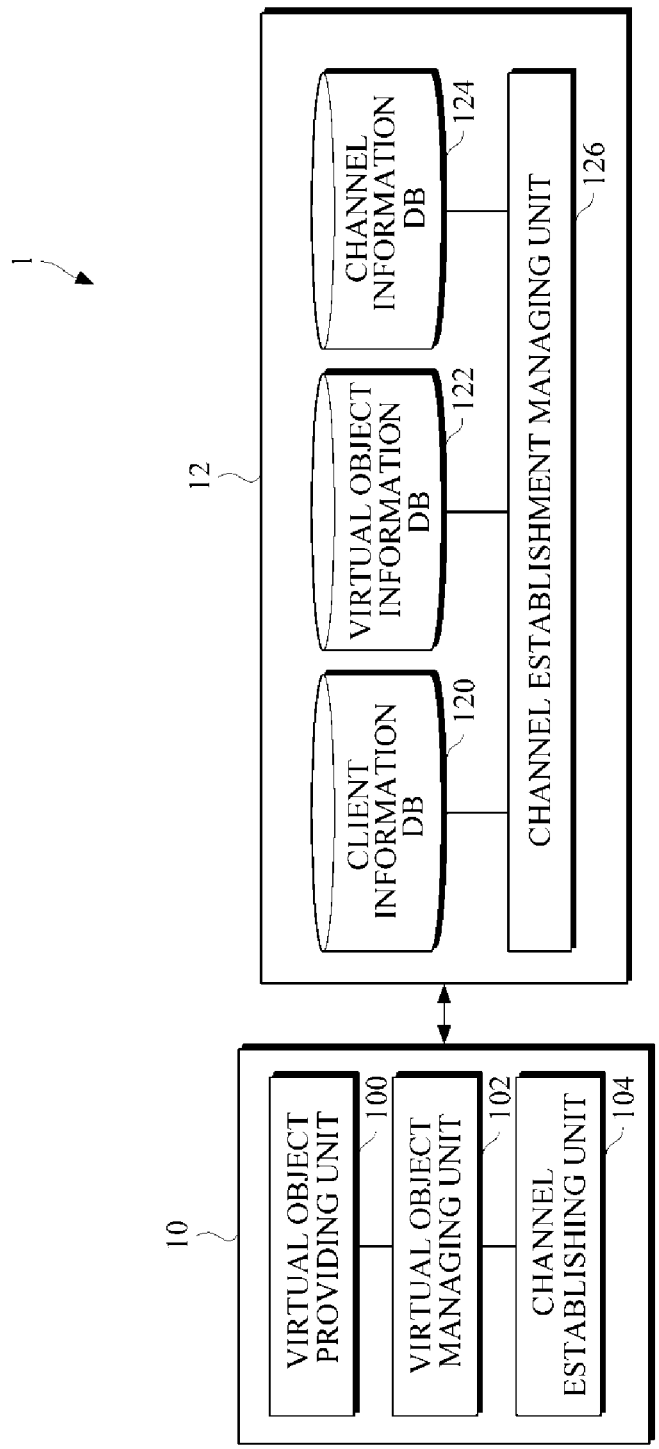
FIG. 1 is a diagram illustrating an example of an Augmented Reality (AR)-based communication system according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, XZZ, YZ, X).

FIG. 1 is a diagram illustrating an example of an Augmented Reality (AR)-based communication system according to an exemplary embodiment of the present invention.

Referring to FIG. 1, the AR-based communication system 1 includes a terminal 10 and a server 12.

The AR-based communication system 1 may provide users with a communication service associated with reality by combining an AR technology with technologies for channel establishment, information management, and connections between users. The AR-based communication system 1 may augment a real environment that may be viewed through a camera of a terminal 10 (e.g., a mobile terminal, a smartphone, or the like) with a virtual environment including dynamic virtual objects, and display the augmented environment. The AR-based communication system 1 may utilize an AR technique to combine a real environment with a virtual environment. In more detail, the AR-based communication system 1 may utilize a communication service technique of enabling communications by establishing a communication channel between users using a virtual object.

The real environment may be a camera view that may be viewed through the camera of the terminal 10. Each dynamic virtual object may be a graphical image or a photograph image of a flying animal or a movable object. For example, the flying animal may be a bird, a butterfly, a dragonfly, or a fly, and the movable object may be an airplane or a UFO. Further, the dynamic virtual object may be a 2- or 3-dimensional image, and the dynamic virtual object may be displayed as static or moving around a display screen of the terminal 10. The dynamic virtual object may be provided as a game format in which AR is combined with a social network through an application that is executed in the terminal 10. A user of the terminal 10 may select a virtual object, for example, by catching a butterfly image moving in the captured real environment image.

Hereinafter, a communication process using AR between receiving and transmitting terminals according to an exemplary embodiment of the present invention will be described. First, the transmitting terminal may augment a real environment viewed through a camera with a virtual environment including one or more dynamic virtual objects and display the augmented environment. A first user of the transmitting terminal may select a dynamic virtual object among dynamic virtual objects displayed on the augmented environment, and the first user's selection may be input to the transmitting terminal. Further, the first user may select a second user with whom the first user wants to communicate through the selected dynamic virtual object, and the first user's selection may be input to the transmitting terminal. A communication channel with the selected second user may be established using the selected dynamic virtual object, and the dynamic virtual object may be transmitted to a receiving terminal of the second user through the communication channel.

The receiving terminal may augment a real environment that may be viewed through a camera of the receiving terminal with a virtual environment including dynamic virtual objects, and display the augmented environment. The second user of the receiving terminal may select the dynamic virtual object transmitted from the transmitting terminal of the first user among the dynamic virtual objects displayed on the augmented environment, and the second user's selection may be input to the receiving terminal. The receiving terminal may provide the second user with channel information included in the selected dynamic virtual object, and establish a method for communicating with the first user based on the channel information.

The game format in which AR is combined with a social network may include a first operation of augmenting a real environment viewed through a camera with a virtual environment including dynamic virtual objects and displaying the augmented environment, a second operation of allowing the first user to capture a dynamic virtual object using a tool item, a third operation of using the captured dynamic virtual object as a messenger to transmit/receive a message to/from a second user through the virtual object, and a fourth operation of receiving first impression information from the second user if the second user selects the dynamic virtual object.

The AR-based communication system 1 may provide various communication functions using the dynamic virtual object. For example, text messages, voice messages, video messages, memos, multimedia data, or advertisement data, as well as text-based social network services, may be transmitted to (or received from) other users together with virtual objects.

Further, the AR-based communication system 1 may provide a method for establishing a new communication between users. If a user uploads a comment on a conventional social network website, the user may not select other parties who are allowed to read the comment, or may not induce other parties to selectively read the individual comment among many articles. However, in the AR-based communication system 1, a user who creates a message may select a specific user, a specific group, or a user at a specific location who is allowed to read the message. Also, the user may use a decoration item to induce designated users to read the message created by the user.

Hereinafter, components of the terminal 10 and the server 12 will be described in more detail, referring to FIG. 1.

The terminal 10 includes a virtual object managing unit 102, a virtual object providing unit 100, and a channel establishing unit 104.

The virtual object managing unit 102 manages virtual objects and targets to which communication channels may be established using the virtual objects. The targets may be users registered in a contact list of the terminal 10, users subscribing in a social network service, new users, users located in a selected region, random users, selected regions, or random regions. The social network service may include conventional network-based services, such as Twitter®, Facebook®, Cyworld®, and Kakaotalk®, and all future network-based services.

The virtual object providing unit 100 may combine a real environment that is viewed through a camera of the terminal 10 with virtual objects that are managed by the virtual object managing unit 102, and display the combined AR environment on a screen of the terminal 10. Then, a user may select a virtual object among the displayed virtual objects, for example, in a manner to capture the virtual object using a tool item.

The channel establishing unit 104 may establish a communication channel with a selected target, and transmit the selected virtual object to the target through the communication channel to communicate with the target. Further, the channel establishing unit 104 may determine whether communication channel information to the target through the virtual object exists. If no communication channel information exists, the channel establishing unit 104 may send a request to the server 12 to establish a new communication channel. If the server 12 establishes a new communication channel, the channel establishing unit 104 may enable a communication with the selected target through the new communication channel. Information about the new communication channel may include information of a method for communicating with the selected target. The channel establishing unit 104 may establish the communication channel based on contact information registered in the terminal 10 or information, such as log, account, or activity information, corresponding to a social network service.

Further, the channel establishing unit 104 may link at least one of a text message, a voice message, a video message, a memo, a data file, and multimedia data in a virtual object selected by a user, and transmit the virtual object to a selected target along with linked information. Further, the channel establishing unit 104 may link advertisement data in a virtual object selected by a user and transmit the virtual object with the linked advertisement data to a selected target.

The server 12 includes a client information database (DB) 120, a virtual object information database (DB) 122, a channel information database (DB) 124, and a channel establishment managing unit 126. The server 12 may include or communicate with a processor (not shown) to manage and control the components of the server 12.

The client information database 120 may manage client information including information about service users, information about user terminals, and information about a service usage. The information about service users may include service subscription information of terminal users. For example, the information about service users may include personal information of service users, such as genders, identifications (IDs), nicknames, ages, occupations, blood types, tastes or preferences, etc. The information about user terminals may include information about the specifications and locations of user terminals. The information about a service usage may include usage frequency of the service, items, the number of acquired virtual items, message information, etc. for each user. The virtual object information database 122 may include a processor (not shown), and may create dynamic virtual objects that may be combined with a real environment viewed through a camera of a terminal, and manage the created virtual objects. The channel information database 124 may manage channel information for establishing communication channels between terminals through virtual objects. The channel establishment managing unit 126 may establish a communication channel for transmitting a virtual object between terminals using client information and channel information, and manage the established communication channel.

Figure 2:
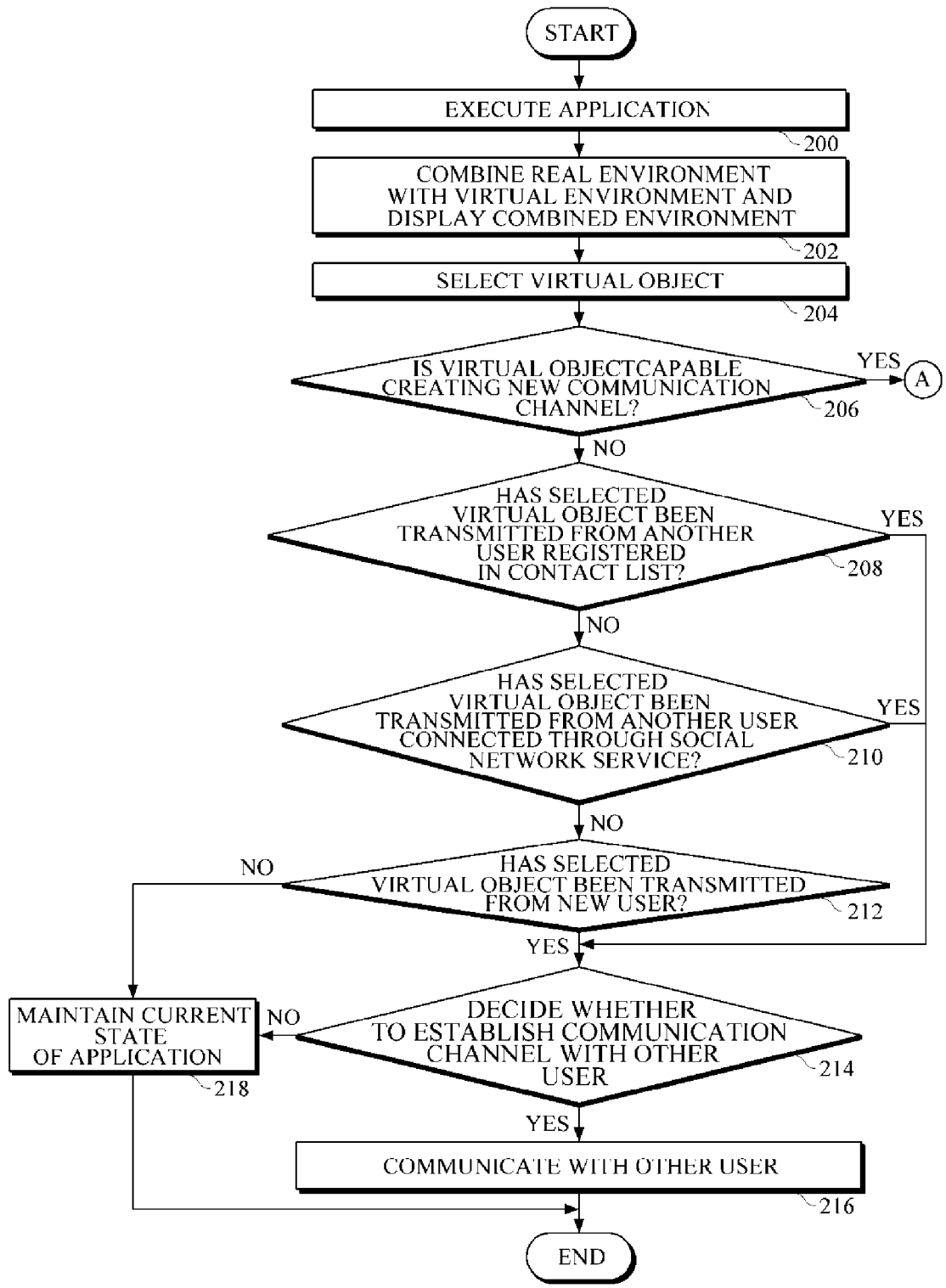
FIG. 2 is a flowchart illustrating a method in which a terminal establishes a communication channel using AR according to an exemplary embodiment of the present invention.

FIG. 2 is a flowchart illustrating a method in which a terminal establishes a communication channel using AR according to an exemplary embodiment of the present invention. FIG. 2 will be described as if performed by terminal 10 shown in FIG. 1, but is not limited as such.

Referring to FIG. 1 and FIG. 2, an application is executed in operation 200. The terminal 10 may combine a real environment viewed through a camera with a virtual environment including dynamic virtual objects and display the combined environment in operation 202. A user of the terminal 10 may select a dynamic virtual object among the available dynamic virtual objects, and input a selection input to select a dynamic virtual object to the terminal 10 in operation 204. Then, it may be determined whether the selected dynamic virtual object is capable of creating a new communication channel in operation 206. A dynamic virtual object may not be capable of creating a new communication channel, if the dynamic virtual object is already dedicated for a communication channel with a specific target. If the dynamic virtual object is already dedicated for a preset communication channel with a specific target, the dynamic virtual object may be used to establish the preset communication channel with the target by retrieving channel information of the preset communication channel. Further, a dynamic virtual object may not be capable of creating a new communication channel, if the dynamic virtual object is not an appropriate virtual object for a communication channel establishment. If it is determined that the selected dynamic virtual object is not capable of creating a new communication channel in operation 206, it may be determined whether the selected dynamic virtual object has been transmitted from another user registered in a contact list of the terminal 10 in operation 208, it may be determined whether the selected dynamic virtual object has been transmitted from another user connected through a social network service in operation 210, and/or it may be determined whether the selected dynamic virtual object has been transmitted from a new user in operation 212. One or more of the operations 208, 210, and 212 may be excluded, or the order thereof may be rearranged according to criteria, such as to reduce network, system, or terminal resources, for example. Then it may be determined whether to establish a communication channel with another user using communication channel information in operation 214. The selected dynamic virtual object may be capable of establishing a dedicated communication channel with the sender of the selected dynamic virtual object. If the user decides not to establish a communication channel with another user, the current state of the application may be maintained in operation 218, and may end the process or may return to operation 202 if the application remains executed (not shown). If the user decides to establish a communication channel with another user, a communication channel may be established using the dynamic virtual object to enable the user to communicate with another user in operation 216.

Figure 3:
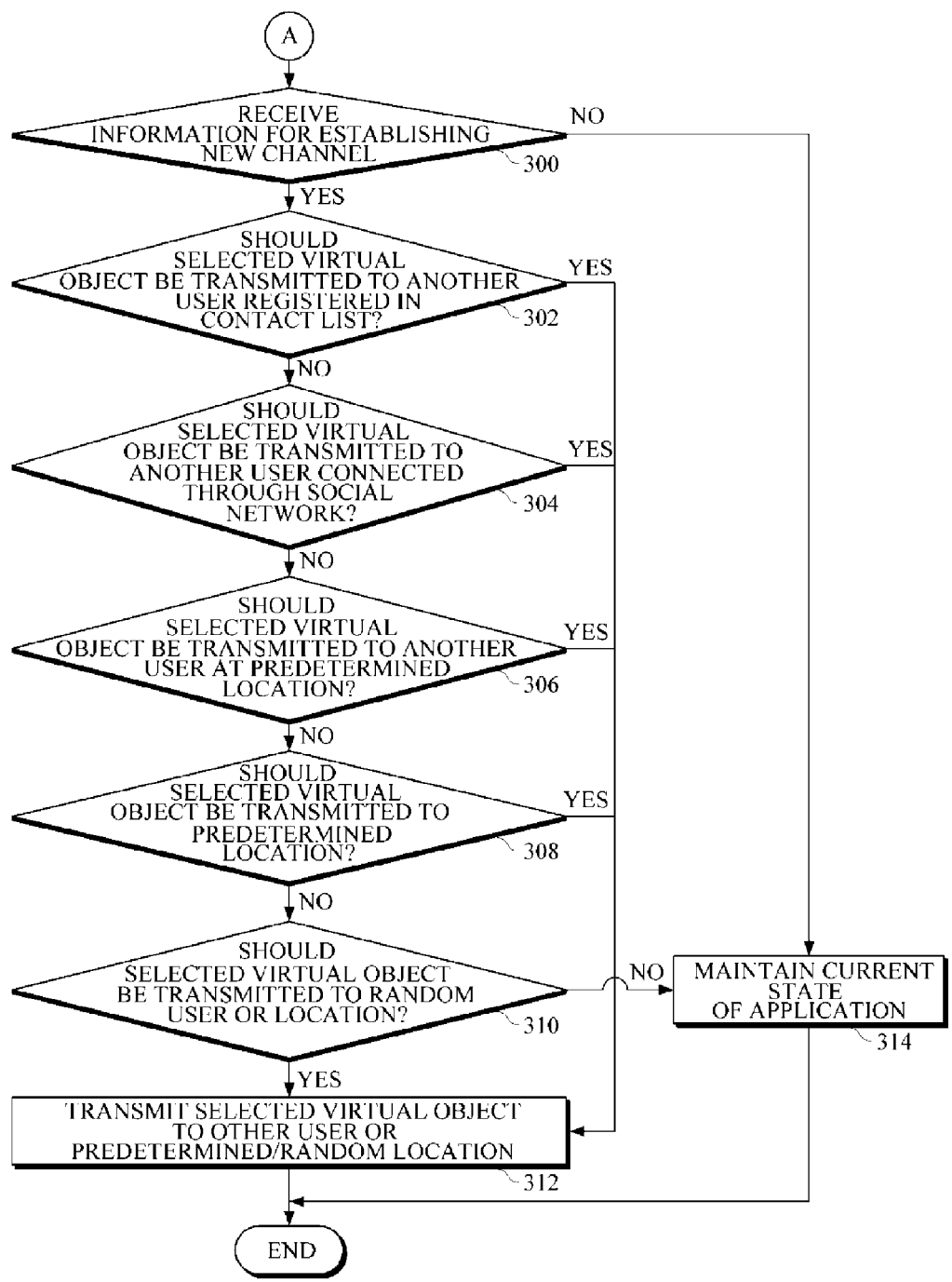
FIG. 3 is a flowchart illustrating a method in which a terminal establishes a communication channel using AR according to an exemplary embodiment of the present invention.

FIG. 3 is a flowchart illustrating a method in which a terminal establishes a communication channel using AR according to an exemplary embodiment of the present invention. FIG. 3 will be described as if performed by terminal 10 shown in FIG. 1, but is not limited as such.

Referring to FIG. 1, FIG. 2, and FIG. 3, the terminal 10 may combine a real environment with a virtual environment including dynamic virtual objects and display the combined environment. Then, a user of the terminal 10 may select a dynamic virtual object among the dynamic virtual objects, and a selection input to select a dynamic virtual object may be input to the terminal 10.

Then, it may be determined whether the selected dynamic virtual object is capable of creating a new communication channel in operation 206. If it is determined that the selected dynamic virtual object is capable of creating a new communication channel in operation 206, it may be determined whether information for establishing a new communication channel is received in operation 300.

If information for establishing a new communication channel is received, it may be determined whether to transmit the selected dynamic virtual object to another user registered in a contact list of the terminal 10 in operation 302, whether to transmit the selected dynamic virtual object to another user connected through a social network service in operation 304, whether to transmit the selected dynamic virtual object to another user at a selected location in operation 306, whether to transmit the selected dynamic virtual object to a selected location in operation 308, and/or whether to transmit the selected dynamic virtual object to a random user/location in operation 310. The selected dynamic virtual object may be transmitted to another user or to the selected or random location in operation 312. The order of these operations 302, 304, 306, 308, and 310 is not limited as shown, and may include fewer than all such operations. If no information for establishing a new communication channel is received or if no user/location to which the selected dynamic virtual object to be transmitted is decided, the current state of the application may be maintained in operation 314, and may continue until a new event is generated or may return to operation 202, if the application remains executed.

Figure 4:
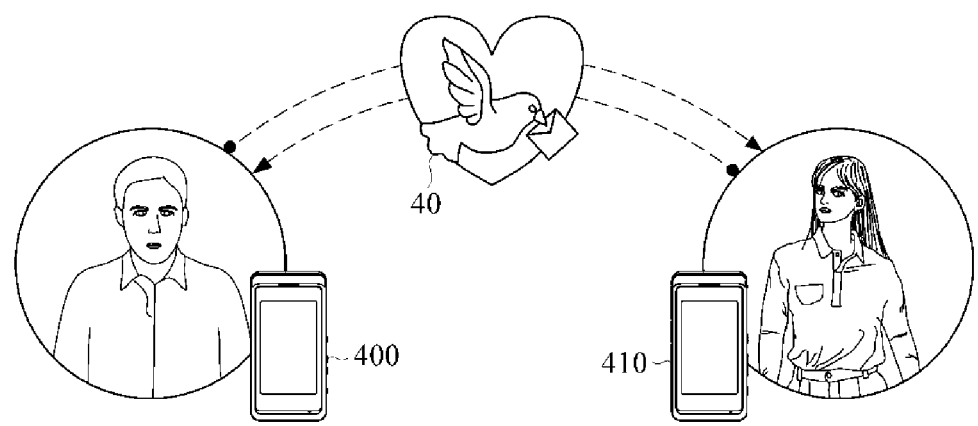
FIG. 4 is a view for explaining a communication channel established between two terminals using AR according to an exemplary embodiment of the present invention.

FIG. 4 is a view for explaining a communication channel established between terminals using AR according to an exemplary embodiment of the present invention.

Referring to FIG. 4, a user of a transmitting terminal 400 may establish a communication channel with a user of a receiving terminal 410 using a dynamic virtual object combined with a real environment and communicate with the user of the receiving terminal 410 through the communication channel.

While an application using dynamic virtual objects is executed, the user of the transmitting terminal 400 may capture a dynamic virtual object (e.g., a butterfly) using a tool item. The tool item may be acquired based on execution information of the application, such as success rate of capturing a dynamic virtual object, the number of execution of the application, or the like. Further, the tool item may be acquired by purchasing the tool item. If the user captures the dynamic virtual object, the user may create a memo, link the memo on the dynamic virtual object, and send the dynamic virtual object with the memo to a specific target. The user of the receiving terminal 410 corresponding to the specific target may capture the dynamic virtual object sent from the transmitting terminal 400 using AR. The dynamic virtual object may be used as a communication channel that connects the user of the transmitting terminal 400 with the user of the receiving terminal 410.

Figure 5:
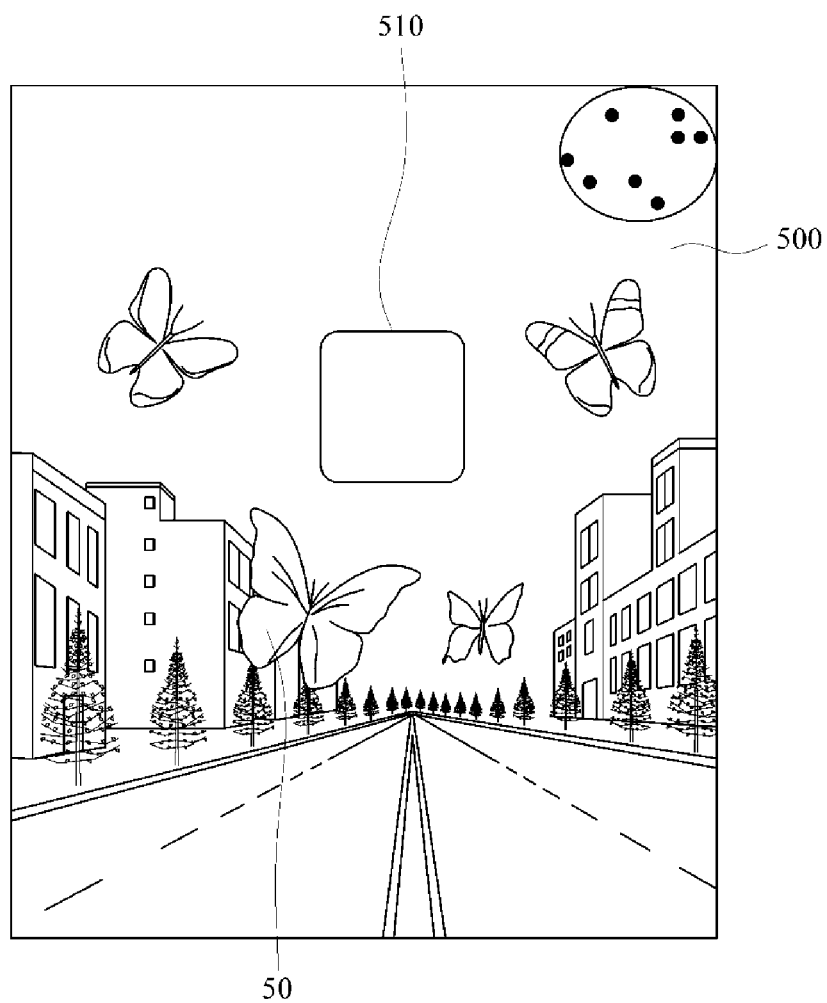
FIG. 5 illustrates a terminal screen on which a real environment is combined with a virtual environment including dynamic virtual objects according to an exemplary embodiment of the present invention.

FIG. 5 illustrates a terminal screen on which a real environment 500 is combined with a virtual environment including dynamic virtual objects according to an exemplary embodiment of the present invention.

Referring to FIG. 5, the terminal may combine the real environment 500 viewed through a camera with the virtual environment including a dynamic virtual object 50 and display the combined environment. The dynamic virtual object 50 may be an image of a flying animal or a movable object. For example, the flying animal may be a bird, a butterfly, a dragonfly, or a fly, and the movable object may be an airplane or a UFO. Also, the dynamic virtual object 50 may be a 2- or 3-dimensional object. Further, as illustrated in FIG. 5, if a user may capture a road-view including a road and many buildings using a camera, a screen on which a butterfly image 50 as a virtual object may move around in the display.

A user of the terminal may select a virtual object among the virtual objects that are dynamically moving around, and the selected virtual object may be input to the terminal. For example, the terminal may recognize the user's selection by sensing a touch of the user using a touch sensor or by sensing the user's motion using a Gyro-sensor. Selection tool 510 for allowing the user to select a virtual object may be displayed on the terminal screen.

The operations of providing a virtual object and receiving a user's selection, as described above, may be provided as a game format in which AR is combined with a social network service while an application of a terminal is executed.

Figure 6:
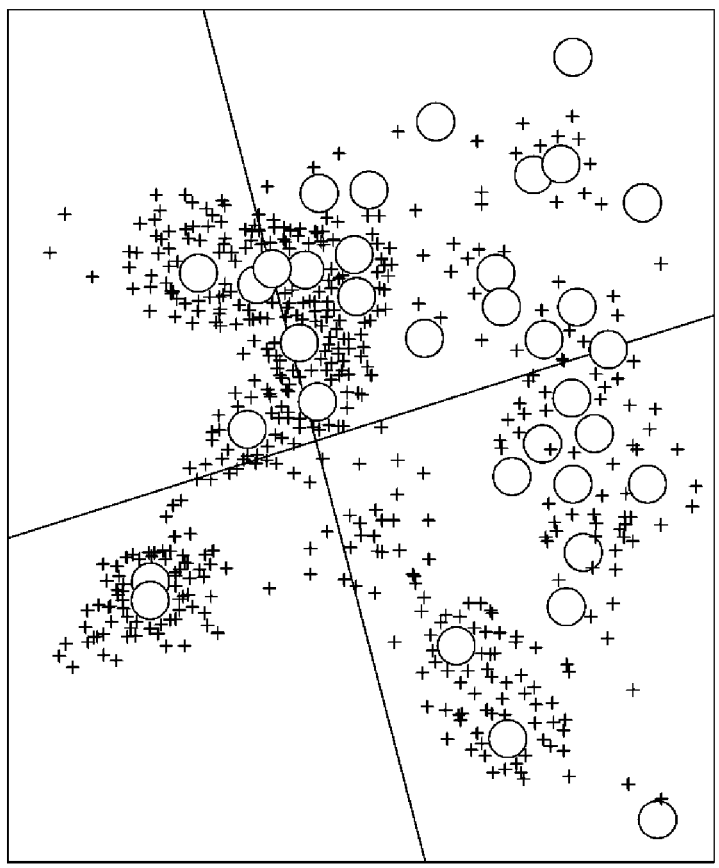
FIG. 6 illustrates a virtual object map for guiding a user to select a virtual object according to an exemplary embodiment of the present invention.

FIG. 6 illustrates a virtual object map for guiding a user to select a virtual object according to an exemplary embodiment of the present invention.

Referring to FIG. 6, a terminal may provide map information from which distribution of virtual objects may be recognized. Then, the user may recognize the concentration of the virtual objects using the map information and select a region. For example, the user may recognize a region where many butterflies are located from the map information, and may capture a butterfly located in the region.

Figure 7:
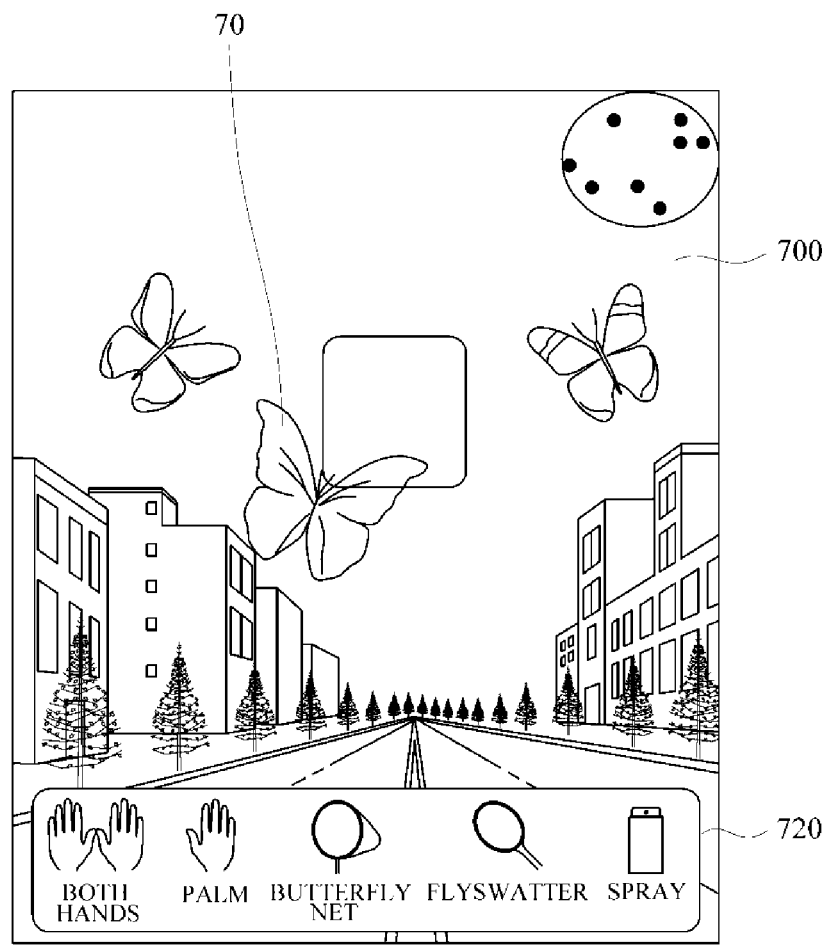
FIG. 7 illustrates a terminal screen for explaining an operation of selecting a virtual object using a tool item according to an exemplary embodiment of the present invention.

FIG. 7 illustrates a terminal screen for explaining an operation of selecting a virtual object using a tool item according to an exemplary embodiment of the present invention.

Referring to FIG. 7, the terminal may provide tool items 720 for allowing a user to select a virtual object. Then, a user of the terminal may select a virtual object 70 in a real environment 700 using one of the tool items 720, and a selection input to select the virtual object 70 may be input to the terminal. As illustrated in FIG. 7, the tool items 720 may be displayed on the lower part of the terminal screen. The user may capture the dynamic virtual object 70 using one of the tool items 720. The tool items 720 may include an arbitrary tool, such as two hands, a palm, a butterfly net, a flyswatter, or a spray for capturing a virtual object. Further, the terminal may set a game rule such that a success ratio of the selection may be increased according to the user's activity using the corresponding service.

Figure 8:
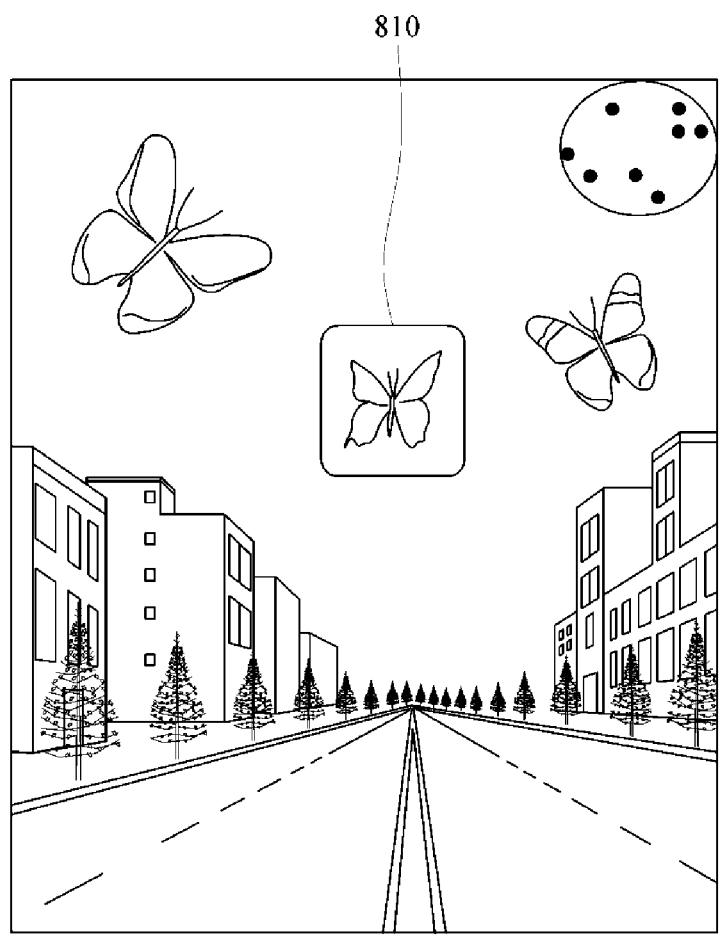
FIG. 8 illustrates a terminal screen on which a virtual object is selected according to an exemplary embodiment of the present invention.

FIG. 8 illustrates the terminal screen on which a virtual object is selected according to an exemplary embodiment of the present invention.

Referring to FIG. 8, a virtual object may be selected through the process of selecting a virtual object, as described above with reference to FIG. 7. FIG. 8 shows a terminal screen when a virtual object has been selected through a selection tool 810. Further, the terminal may provide a decoration item that may decorate the selected virtual object. If the user decorates the virtual object and transmits the decorated virtual object to another user, the user who received the decorated virtual object may select the decorated virtual object with a higher possibility.

Figure 9:
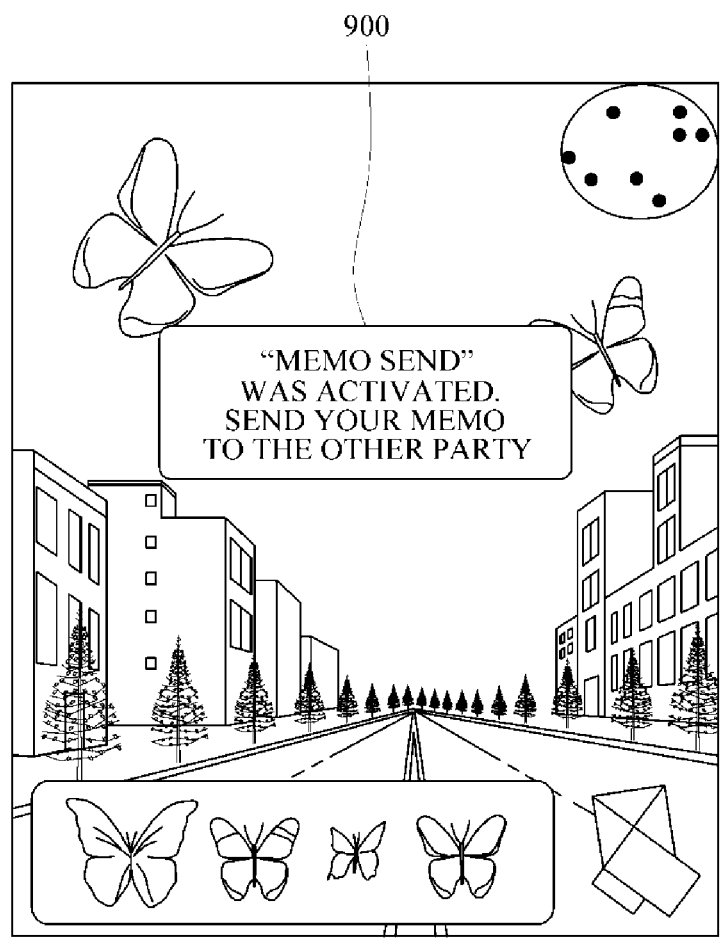
FIG. 9 illustrates a terminal screen for explaining an operation of activating a "memo send" function to send a memo with a virtual object according to an exemplary embodiment of the present invention.

FIG. 9 illustrates a terminal screen for explaining an operation of activating a "memo send" function to send a memo with a virtual object according to an exemplary embodiment of the present invention.

Referring to FIG. 9, if a user selects a virtual object, the selected virtual object may be transmitted to another user together with at least one of a text message, a voice message, a memo, a data file, and multimedia data. For example, as illustrated in FIG. 9, the user may activate a "memo send" function 900 to create a memo, and link the memo on a virtual object to transmit the virtual object along with the memo to another user. Further, the user may include advertisement data in a selected virtual object and transmit the virtual object including the advertisement data to another user.

Figure 10:
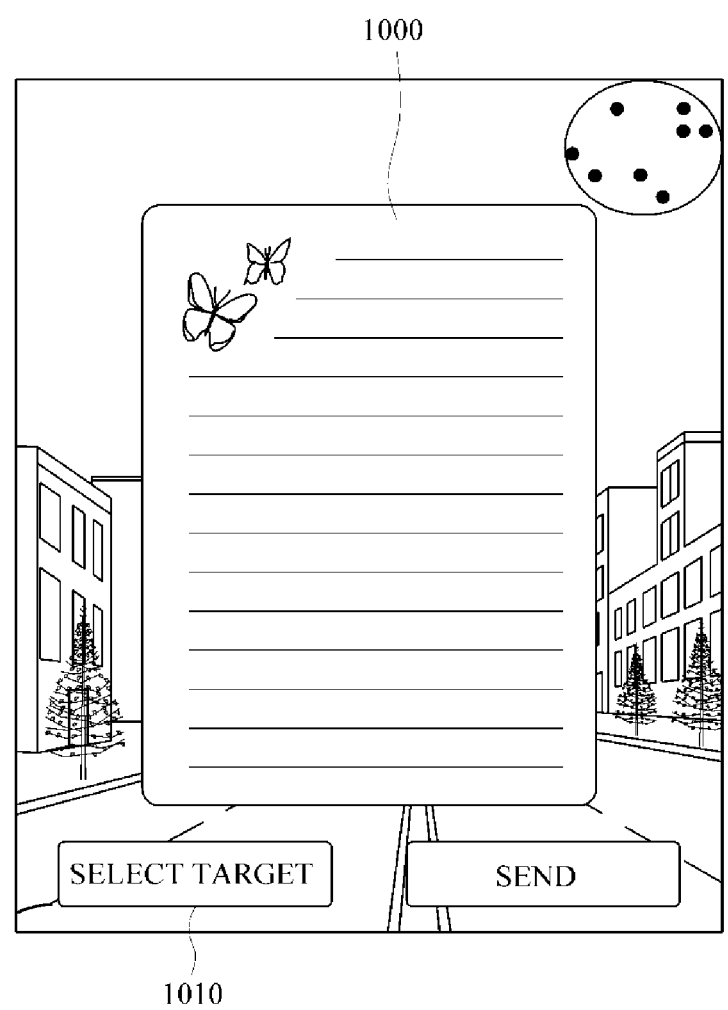
FIG. 10 illustrates a terminal screen on which a "memo send" window is displayed according to an exemplary embodiment of the present invention.

FIG. 10 illustrates a terminal screen on which a "memo send" window is displayed according to an exemplary embodiment of the present invention.

Referring to FIG. 10, a user may create a message through the "memo send" window 1000. Further, the user may select a target to which the message is transmitted. For example, the user may select an icon 1010 to select the target in a target list. The target may include location information indicating a specific location and information indicating a specific user. For example, the user may select a user registered in a contact list of the terminal, a user connected through a social network service, a new user, a user at a selected location, or a random user. Further, the user may select a region or a random region to select a target. If the user selects a target, the terminal may establish a communication channel with the selected target and transmit the virtual object to the target through the communication channel so that the user may communicate with the target. Further, a game rule may be applied to control accuracy of the connection information indicating a location and accuracy of information indicating a target may be increased according to the user's activity about the corresponding service.

Specifically, dynamic virtual objects may be classified into various ranks. Higher-ranked dynamic virtual objects may be harder to capture than lower-ranked dynamic virtual objects. Further, tool items may be classified into various ranks. A higher-ranked tool item may raise success ratio of capturing a dynamic virtual object more than a lower-ranked tool item. Higher-ranked dynamic virtual objects may appear if the user captures a specific number of lower-ranked dynamic virtual objects. The rank of each dynamic virtual object may be indicated along with the dynamic virtual object.

Figure 11:
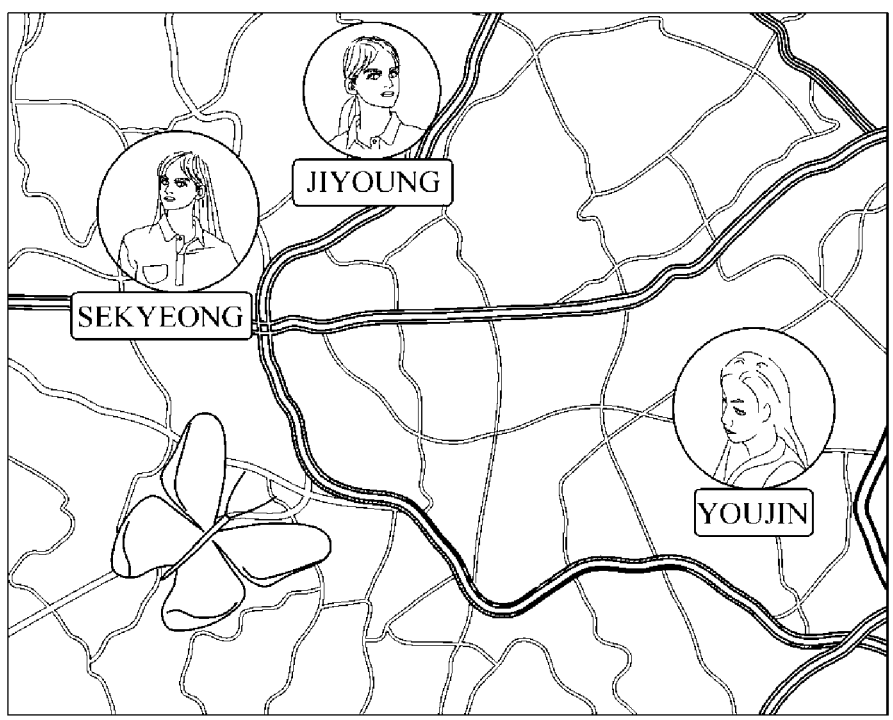
FIG. 11 illustrates a terminal screen on which the location of the virtual object and users around the virtual object are displayed according to an exemplary embodiment of the present invention.

FIG. 11 illustrates a terminal screen on which the location of the virtual object and users around the virtual object are displayed according to an exemplary embodiment of the present invention.

Referring to FIG. 11, the virtual object may be transmitted to the selected target according to a degree of service activity. The user may transmit the virtual object to users of a group which the user selects. For example, the virtual object may be transmitted to a group having specific gender, ages, occupations, tastes, blood types, etc. Further, the user may transmit the virtual object after decorating the virtual object using a decoration function so that the virtual object may look better than other virtual objects. The selected virtual object may be transmitted as a voice message or a video message in the form of an echo around a target which acquires the virtual object.

Figure 12:
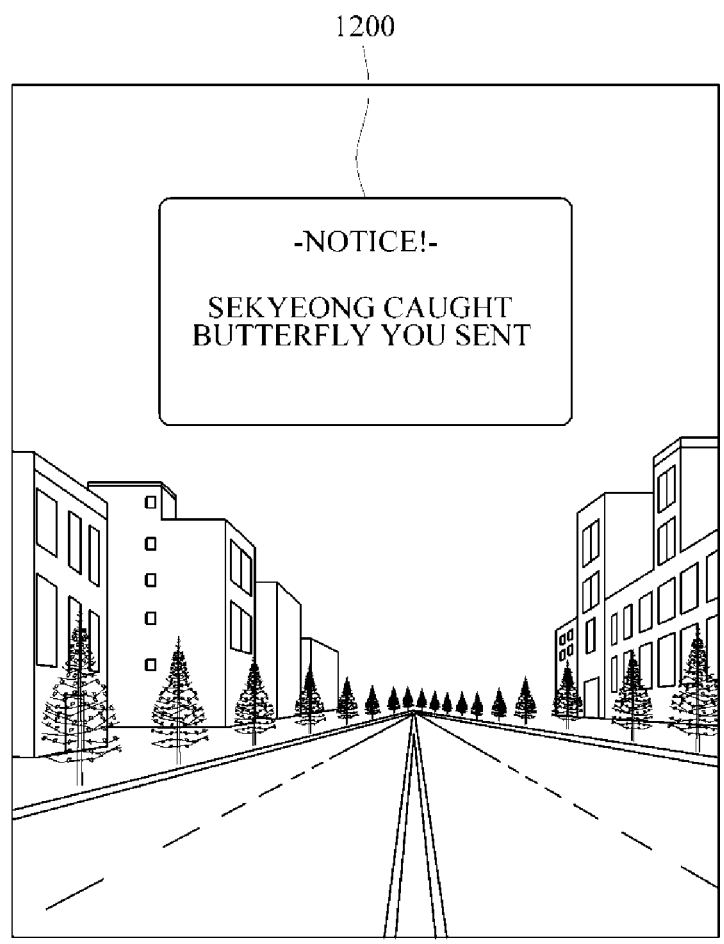
FIG. 12 illustrates the terminal screen on which a notice message is displayed according to an exemplary embodiment of the present invention.

FIG. 12 illustrates the terminal screen on which a notice message is displayed according to an exemplary embodiment of the present invention.

Referring to FIG. 12, if the transmitting terminal transmits the virtual object to another terminal and a user of the receiving terminal selects the virtual object, the transmitting terminal may display a notice message notifying that the virtual object has been selected by the receiving terminal. For example, as illustrated in FIG. 12, the transmitting terminal may display a message notifying that the receiving terminal has selected the virtual object, i.e., "Miss Sekyeong caught a butterfly which you sent" 1200.

Figure 13:
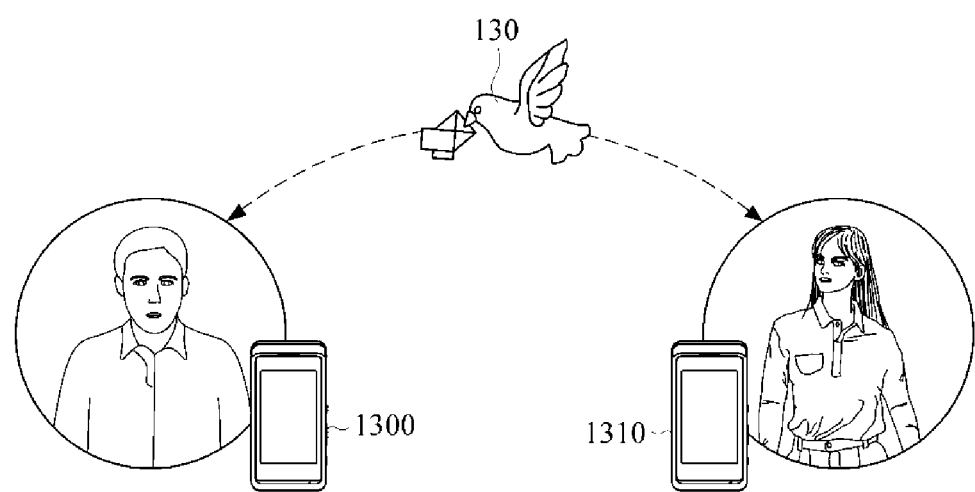
FIG. 13 is a view for explaining an operation of receiving first impression information when another user selects the virtual object according to an exemplary embodiment of the present invention.

FIG. 13 is a view for explaining an operation of receiving first impression information when another user selects the virtual object according to an exemplary embodiment of the present invention.

Referring to FIG. 13, if a user of a terminal 1300 transmits a virtual object 130 to another terminal 1310, a user of the terminal 1310 may select the virtual object 130. The user of the terminal 1310 may create first impression information from the virtual object 130. The first impression information may be feedback information that may indicate a response to or feeling about the virtual object determined from the appearance of the virtual object before the user of the other terminal 1310 reads the message, or the like. The first impression information may be displayed by an emoticon, etc.

which may convey or represent an emotion. The user of the terminal 1300 may receive the first impression information from the user of the other terminal 1310, thus recognizing a first impression about the user of the terminal 1300 from the user of the other terminal 1310.

Further, the user of the other terminal 1310 may link a message on the virtual object and sends the virtual object 130 back to the user of the terminal 1300. The user of the terminal 1300 may check the virtual object 130 received from the user of the other terminal 1310 in the real environment viewed through the camera. If the user of the terminal 1300 selects the virtual object 130, the user of the terminal 1300 may check the message created by the user of the other terminal 1310. The virtual object 130 may be used as a messenger that connects the user of the terminal 1300 with the user of the other terminal 1310.

By applying an AR-based game format to a social network service, and more specifically by combining a real environment that is viewed through a camera with a virtual environment including dynamic virtual objects, a user may be provided with the combined environment in a manner to allow the user to capture a dynamic virtual object with a tool item. Further, the user may transmit a message to another user using the dynamic virtual object as a messenger, and receive first impression information from the other user using the dynamic virtual object. Further, various communication functions may be provided. For example, text messages, voice messages, video messages, memos, multimedia data, or advertisement data, as well as text- based social network services, may be transmitted to and/or received from other users together with virtual objects.

Also, new communication channels between users may be established using the dynamic virtual object. For example, a user may create a message and select a specific user, a specific group, or a user at a specific location as a message receiving target. Also, the user may use a decoration item to induce other users to read the message written by the user.

Further, a function of differentiating users may be provided. For example, if a first user transmits a virtual object to a second user and the second user selects the virtual object, first impression information about the first user may be transmitted from the second user so that the first user may recognize the second user's impression about the first user.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for performing a communication using a virtual object, comprising:
    identifying a dynamic virtual object on a display screen in response to a selection input;
    determining a target to which the identified dynamic virtual object is to be transmitted;
    establishing a communication channel with the target through the identified dynamic virtual object: and
    performing a communication through the identified dynamic virtual object,
    wherein the communication channel provides at least one operation among a text message, a voice message, a video message, a voice call, a video call, multimedia data, and advertisement data;
    if the dynamic virtual object is identified by the selection input, determining whether a preset communication channel is associated with the dynamic virtual object,
    wherein, if the preset communication channel is associated with the dynamic virtual object, the preset communication channel is established as the communication channel with the target, and, if the preset communication channel is not associated with the dynamic virtual object, a new communication channel is established as the communication channel with the target designated by a user.

2. The method of claim 1, further comprising transmitting the identified dynamic virtual object to the target, and the communication channel is established using contact information or information corresponding to a social network service.

3. The method of claim 1, further comprising displaying an augmented reality comprising the dynamic virtual object.

4. The method of claim 1, further comprising providing a tool item to select the dynamic virtual object, wherein the dynamic virtual object moves in the display screen comprising the dynamic virtual object.

5. The method of claim 1, further comprising linking the dynamic virtual object with at least one of a text message, a voice message, a video message, a data file, a voice call, a video call, and an advertisement data.

6. The method of claim 1, wherein identifying the dynamic virtual object is based on at least one of a tool item and accuracy of the selection input.

7. The method of claim 1, further comprising:
    providing map information to indicate a distribution of dynamic virtual objects.

8. A method for communicating using a virtual object, comprising:
    generating an augmented environment by combining a real environment with a virtual environment, the virtual environment comprising one or more dynamic virtual objects;
    displaying the augmented environment;
    receiving an object selection input, the object selection input corresponding to a first dynamic virtual object among the dynamic virtual objects;
    receiving a selection of a target using the first dynamic virtual object; and establishing a communication channel with the target through the first dynamic virtual object, and transmitting the first dynamic virtual object to the target;
    if the dynamic virtual object is identified by the selection input, determining whether a preset communication channel is associated with the dynamic virtual object,
    wherein, if the preset communication channel is associated with the dynamic virtual object, the preset communication channel is established as the communication channel with the target, and, if the preset communication channel is not associated with the dynamic virtual object, a new communication channel is established as the communication channel with the target designated by a user.

9. A terminal to communicate using a virtual object, comprising:
    a virtual object providing unit to provide a dynamic virtual object on a display screen;
    a virtual object managing unit to store the dynamic virtual object and target information of a target corresponding to the dynamic virtual object;
    a virtual object selection unit to select the dynamic virtual object in response to a selection input; and a channel establishing unit to establish a communication channel with the target through the dynamic virtual object;

if the dynamic virtual object is identified by the selection input, determining whether a preset communication channel is associated with the dynamic virtual object, wherein, if the preset communication channel is associated with the dynamic virtual object, the preset communication channel is established as the communication channel with the target, and, if the preset communication channel is not associated with the dynamic virtual object, a new communication channel is established as the communication channel with the target designated by a user.

10. The terminal of claim 9, wherein the virtual object providing unit further provides an augmented reality comprising the dynamic virtual object.

11. The terminal of claim 9, wherein the virtual object providing unit further provides a tool item to select the dynamic virtual object, and wherein the dynamic virtual object moves in the display screen.

12. The terminal of claim 11, wherein the virtual object providing unit links the dynamic virtual object with at least one of a text message, a voice message, a video message, a data file, a voice call, a video call, and an advertisement data.

13. The terminal of claim 9, wherein the channel establishing unit transmits the dynamic virtual object to the target, and the communication channel is established using contact information or information corresponding to a social network service.

14. The terminal of claim 9, wherein the virtual object selection unit selects the dynamic virtual object based on at least one of a tool item and accuracy of the selection input.

15. A server to provide a communication using a virtual object, comprising:

a client information database to store client information comprising information of a terminal;

a virtual object information database to store and manage information corresponding to a generated dynamic virtual object;

a processor to generate the dynamic virtual object, and to provide the dynamic virtual object to the terminal; and a channel information database to store channel information between the terminal and a target terminal, the channel information associated with the dynamic virtual object wherein a communication channel between the terminal and the target terminal is established through the dynamic virtual object;

if the dynamic virtual object is identified by the selection input, determining whether a preset communication channel is associated with the dynamic virtual object, wherein, if the preset communication channel is associated with the dynamic virtual object, the preset communication channel is established as the communication channel with the target, and, if the preset communication channel is not associated with the dynamic virtual object, a new communication channel is established as the communication channel with the target designated by a user.

16. The server of claim 15, further comprising a channel establishment managing unit to establish a communication channel between the terminal and the target terminal using the channel information and the dynamic virtual object.

17. The server of claim 15, wherein the virtual object information database further stores a tool item to select the dynamic virtual object, and the processor transmits the tool item to the terminal.

18. The server of claim 15, wherein the virtual object information database further stores linking information to link the dynamic virtual object with at least one of a text message, a voice message, a video message, a data file, a voice call, a video call, and an advertisement data.

19. The server of claim 15, wherein the virtual object information database further comprises control information corresponding to display characteristics of the dynamic virtual object on a display screen of the terminal.

* * * * *